United States Patent
Opris

(12) 
(10) Patent No.: US 6,342,919 B2
(45) Date of Patent: *Jan. 29, 2002

(54) POWER SAVING METHOD USING INTERLEAVED PROGRAMMABLE GAIN AMPLIFIER AND A/D CONVERTERS FOR DIGITAL IMAGING DEVICES

(75) Inventor: Ion E. Opris, Cupertino, CA (US)

(73) Assignee: NuCORE Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,002

(22) Filed: Apr. 8, 1999

(51) Int. Cl.$^7$ ............................ H04N 5/217; H04N 3/14
(52) U.S. Cl. ...................................... 348/241; 348/272
(58) Field of Search ............................... 348/223, 241, 348/242, 257, 265, 266, 272, 306, 222, 571, 584; 358/513, 482; 330/9; 341/172

(56) References Cited

U.S. PATENT DOCUMENTS

| | | | | |
|---|---|---|---|---|
| 4,652,766 A | * | 3/1987 | Wang et al. .................. | 348/306 |
| 4,806,874 A | * | 2/1989 | Michel ............................ | 330/9 |
| 5,216,509 A | * | 6/1993 | Hirasawa ..................... | 348/241 |
| 5,229,772 A | * | 7/1993 | Hanlon ........................ | 341/172 |
| 5,276,508 A | * | 1/1994 | Boisvert et al. .............. | 348/223 |
| 5,329,312 A | * | 7/1994 | Boisvert et al. .............. | 348/257 |
| 5,572,155 A | * | 11/1996 | Tamayama .................... | 348/242 |
| 5,661,522 A | * | 8/1997 | Tomizuka ..................... | 348/265 |
| 5,736,886 A | * | 4/1998 | Manelsdorf et al. .......... | 348/241 |

OTHER PUBLICATIONS

"CCD Signal Proces For Electronic Cameras," *Analog Devices*, AD9802 (1997).

W. Bright, "8b 75MSample/s 70m W Parallel Pipelined ADC Incorporating Double Sampling," ISSCC98, Feb. 6, 1998 IEEE 0–7803–4344–1/98 p. 146.

* cited by examiner

*Primary Examiner*—Wendy R. Garber
*Assistant Examiner*—Luong Nguyen
(74) *Attorney, Agent, or Firm*—Townsend and Townsend and Crew LLP; Kenneth R. Allen

(57) ABSTRACT

For use in a low-power digital imaging devices, for example a low-power single CCD-based digital camera, particularly in a battery-operated camera, a method for implementing video signal processing is provided wherein a single amplifier is employed in switched but parallel and uncorrelated signal paths in a manner which avoids fixed pattern noise that would be introduced by mismatches in gain and offset in various paths. The desired effect is achieved through use of a controller that switches appropriate sets of capacitors in parallel paths to establish different gains for each pixel component. The invention achieves power savings and flexibility to independently control gain of each color component.

14 Claims, 7 Drawing Sheets

POWER SAVING METHOD USING INTERLEAVED PROGRAMMABLE GAIN AMPLIFIER AND A/D CONVERTERS FOR DIGITAL IMAGING DEVICES

BACKGROUND OF THE INVENTION

1. Field of the Invention

This invention relates to digital camera technology and more particularly to a digital camera having reduced power consumption.

Interleaving or ping-pong processing of digital color signals in an analog to digital converter is a known technique for processing signals through switched capacitor circuits. In interleaved processing, there is an inherent mismatch between the passive components used in the two phases, the "ping" path and the "pong" path. The difference or mismatch in gain and offset creates fixed pattern noise which in a video signal would be manifest as a spatial frequency tone. Thus ping-pong processing has never been known to be used in programmable gain amplification for video signal processing.

It is helpful to understand the structure of a class of single chip CCD video sensors, such as that which incorporates the Bayer pattern. RGB pixels are arranged in a distinctive pattern so that a progressive scan through two adjacent lines produces all of the red, green and blue values. The Bayer pixel pattern looks like the following, noting the adjacent RGB pixel group:

A. R G R G R G R G R G R G R G R G
B. G B G B G B G B G B G B G B G B

In the prior art, all color video signals were passed through a single analog channel or path without switching, treating R, G and B identically with the same gain, to produce alternating colors sliced by time. There was a problem with lack of gain control over the separate color components. In order to provide for separate control of gain on each component, it would be necessary to provide separate signal paths, including separate amplifiers in each path.

2. Description of the Prior Art

CCD signal processors for electronic cameras are known, as evidenced by devices such as Analog Devices part AD9802 as described in its Specification Sheet dated at least as early as 1997. FIG. 19 thereof, reproduced herein as FIG. 1 (Prior Art), 5 illustrates a single path processor employing independent amplifiers 12, 14 feeding a single programmable gain amplifier (PGA) 15 as controlled by a controller 19. Because of the inherent mismatch, two different PGAs 16, 18 are used in alternate feedback paths.

While two input paths are shown, there is nothing which conceptually requires two feedback paths except correction of the inherent mismatch.

Switched capacitor gain stages coupled in parallel signal paths have been used in parallel pipelined analog to digital converters are known, as for example described in W. Bright, "8b 75MSample/s 70mW Parallel Pipelined ADC Incorporating Double Sampling," ISSCC98, Feb. 6, 1998, (IEEE 0-7803-4344-1/98) p. 146. The switched capacitors are used during non-overlapping alternate clock phases. Due to natural fabrication limitations in integrated circuits, the accuracy of the foregoing design is limited to about 8 bits. Any gain and offset mismatch, as a result of inherent passive component mismatches in the two paths, introduces an undesirable noise pattern, manifest as noise or a tone.

In conventional CMOS technology, switched capacitor gain stages are implemented by switching among capacitors in a synchronized non-overlapping phase pattern to produce a desired output. The switched capacitor topology is common to various building blocks in a correlated double sample element (CDS), a programmable gain amplifier (PGA) and pipeline analog to digital converter (ADC), which are coupled in series in prior art configurations. However, in integrated circuits, natural fabrication mismatches between the ratio of capacitors limits the accuracy of the gain to be no more than about 8 to 9 bits. Any such gain mismatch between the even and the odd samples introduces an undesired tone or spurious modulation in the signal path equivalent to a fixed pattern noise. Parallel path switched capacitor circuits can share a common amplifier. While the architecture provides much lower power dissipation, the spurious artifacts make this circuit unusable in certain desired applications where noise or spatial frequency tones are intolerable.

SUMMARY OF THE INVENTION

According to the invention, for use in a low-power digital imaging devices, for example a low-power single CCD-based digital camera, particularly in a battery-operated camera, a method for implementing video signal processing is provided wherein a single amplifier is employed in switched but parallel and uncorrelated signal paths in a manner which avoids fixed pattern noise that would be introduced by mismatches in gain and offset in various paths. The desired effect is achieved through use of a controller that switches appropriate sets of capacitors in parallel paths to establish different gains for each pixel component. The invention achieves power savings and flexibility to independently control the gain of each color component.

The invention will be better understood upon reference to the following detailed description in conjunction with the accompanying drawings.

DETAILED DESCRIPTION OF SPECIFIC EMBODIMENTS

Figure 1:
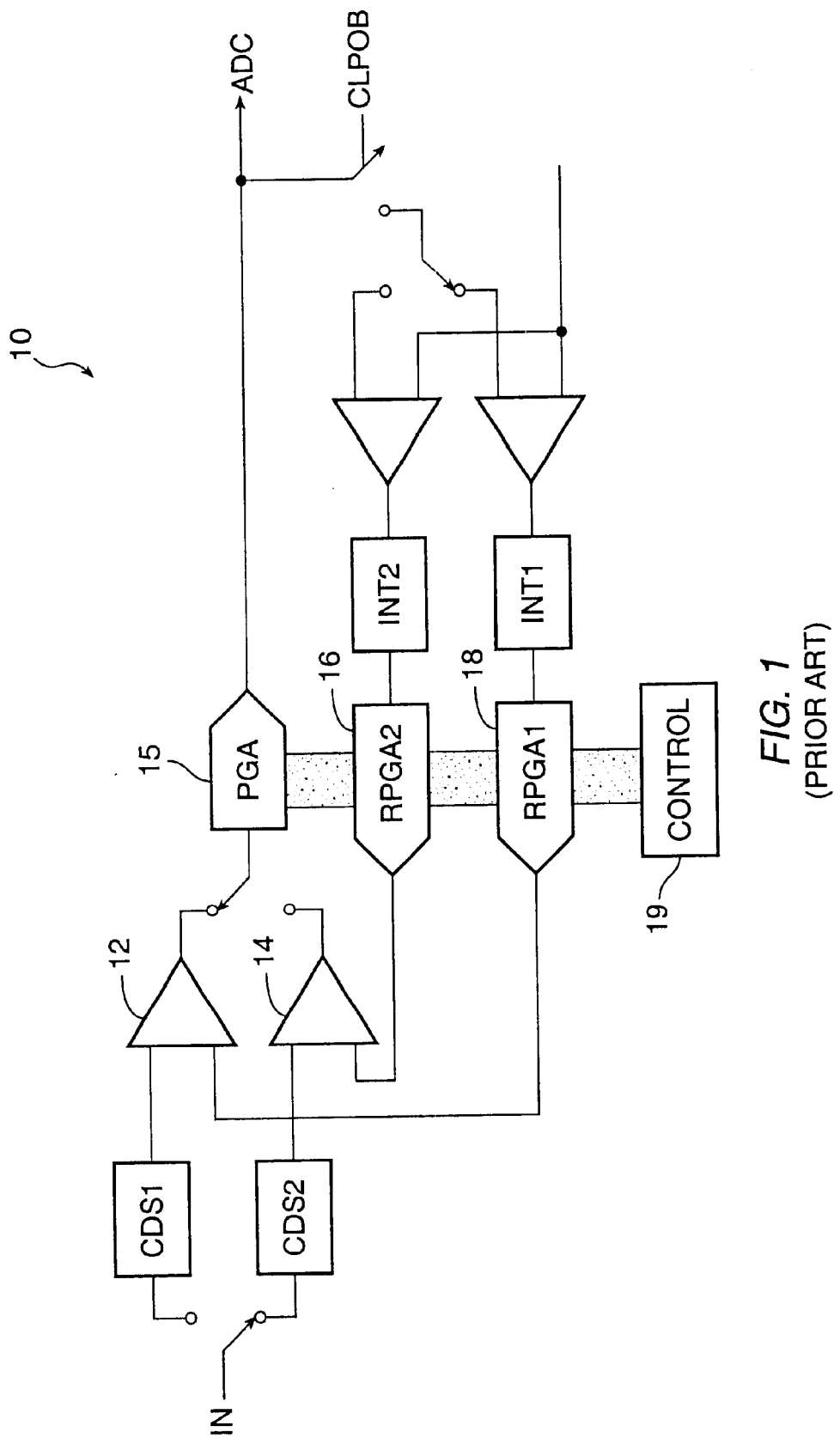
FIG. 1 is a block diagram of a prior art subsystem as previously described.
Figure 2:
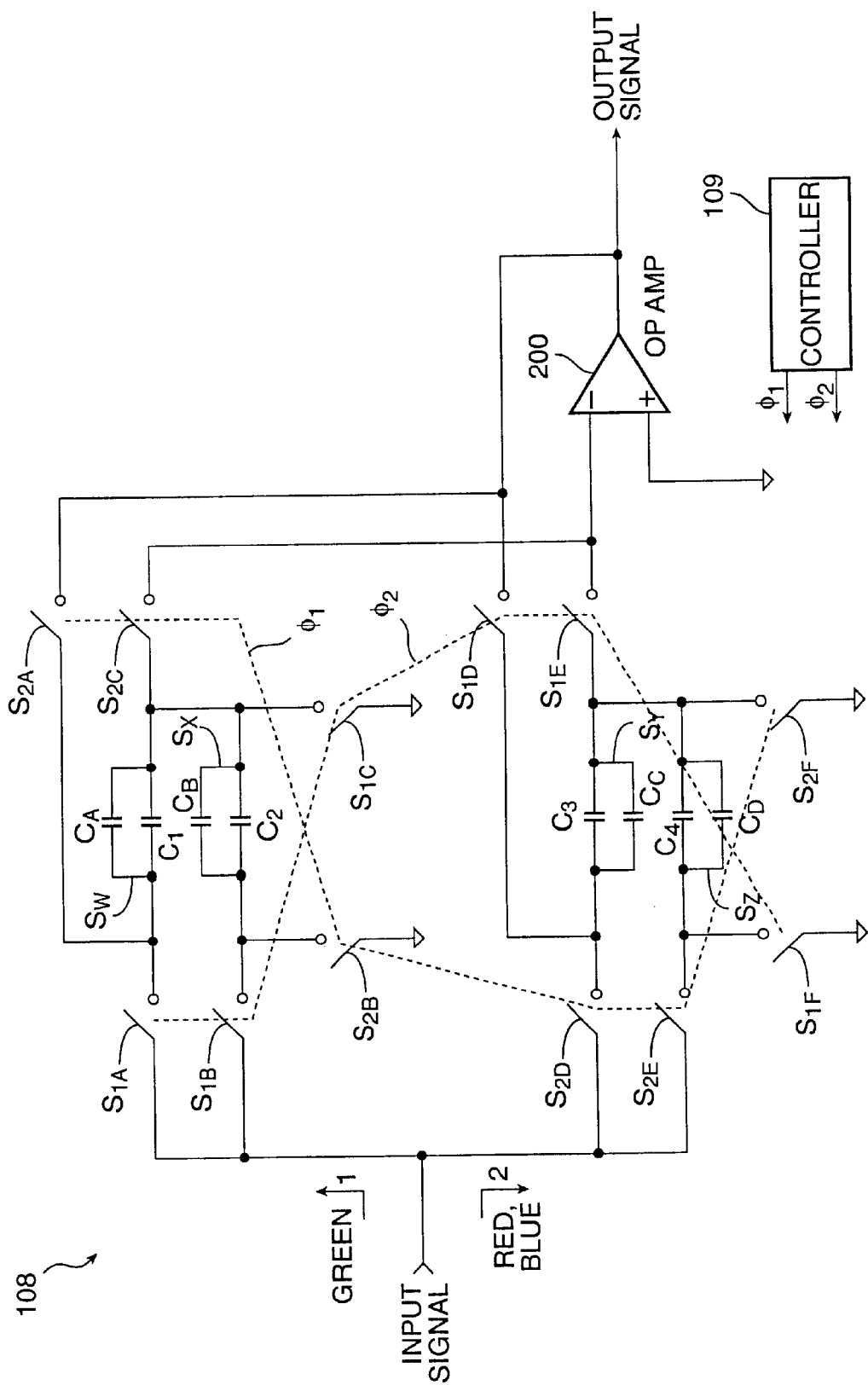
FIG. 2 is a circuit diagram of a two phase circuit according to the invention employing a two-phase clock/controller as hereinafter explained according to the invention.

A parallel signal path embodiment 108 is shown in FIG. 2 wherein two sets of capacitors (C1, C2); (C3, C4) are used during alternating phases of the controlling clock signals Ø1, Ø2 from a controller 109. The roles of the capacitors C1, C2, C3, C4 are changed every other clock cycle so that the two sets of capacitors share the operational amplifier 200 such that it is used for the entire clock cycle. During a first non-overlapping phase of two phase clocks, the switches S1A, S1B and S1C are closed and the input signal is sampled onto capacitors C1 and C2. During the second phase of the clock, which is likewise non-overlapping with the first phase, capacitor C1 is connected to the output (in the feedback loop) through switch S2A. The capacitor C2 is simultaneously connected to signal ground through switch S2B and the common node of the capacitors is connected to the input of the operational amplifier 200 through switch S2C. The paths alternate with non-overlapping phase following the trigger of a pixel clock operating at the sampling rate. Similarly, the controller 109 controls the switching of the capacitors C3 and C4 in alternating sequence with capacitors C1 and C2. It is the ratio of the capacitors which determines the gain of signals applied to the stage including operational amplifier 200. Signal gain for even signal samples is (C1+C2)/C1; and for odd signal samples is (C3+C4)/C3.

According to the invention, the signal gain can be preprogrammed for each signal path, and typically as often as once per line. For example, for all lines, the input signal is routed along signal path 1 for all green pixels, which are preprogrammed with a gain established by a combination of capacitors C1, C2, CA and CB. CA and CB represent capacitance elements that can be added in parallel to C1 and C2 respectively, upon activation of switches Sw and Sx. For odd lines, the input signal is routed along signal path 2 for all red pixels, which are preprogrammed with a gain established by a combination of capacitors C3, C4, CC and CD. CC and CD represent capacitance elements that can be added in parallel to C3 and C4 respectively, upon activation of switches Sy and Sz. During even lines, the input signal is routed along signal path 2 for all blue pixels, which are preprogrammed with a different gain established by the combination of capacitors C3, C4, CC and CD.

Figure 3:
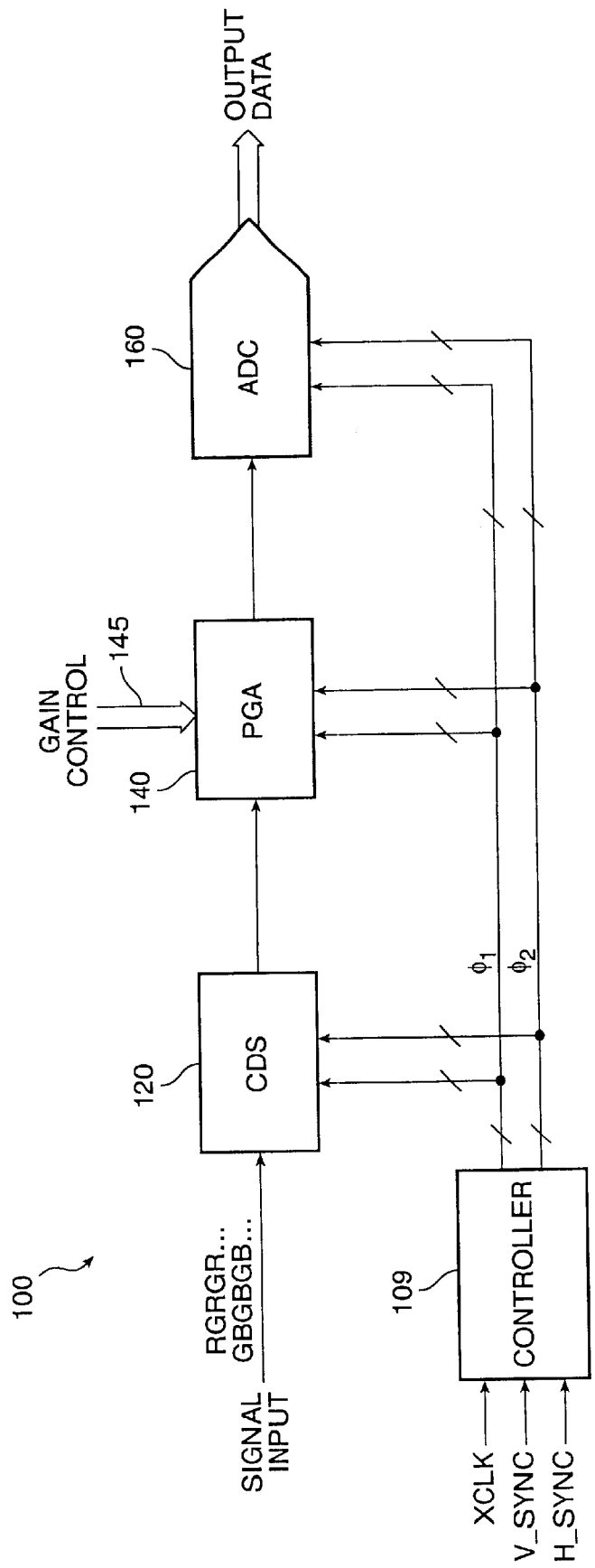
FIG. 3 is a block diagram of a system according to the invention with a clock controller.

Referring to FIG. 3, there is shown a block diagram of a first device 100 operative according to the invention optimized to process Bayer pattern input signals (as defined in U.S. Pat. No. 3,971,065) from a CCD or other photo detector sensor array. The system comprises a CDS 120, a PGA 140 and an ADC 160 controlled by a timing controller 180. For the purposes of this discussion the topology of the CDS 120, PGA 140 and ADC 160 is essentially the same in that input of an operational amplifier 200 as shown in FIG. 2 is alternately fed by two parallel input sets through paired switches (S2A, S2C) and (S1D, S1F). Signal input is supplied to CDS 120, then supplied to the PGA 140, then supplied to the ADC 160. According to the invention, the timing controller 109 is a global timing generator handling a pixel clock (XCLK), a vertical synchronization clock (V_SYNC) and a horizontal synchronization clock (H_SYNC), and controls the clock phases of CDS 120, PGA 140 and ADC 160.

The processing of a Bayer pattern input signal RGRGRG from a CCD or other photo detector sensor array is insensitive to mismatches between parallel processing paths because the successive samples are from different color sensors. The odd samples correspond to color RED (R) signals, while the even samples correspond to the color GREEN (G) signals. There is a fixed assignment between colors and paths. Although there is a mismatch between paths, there is no intrapath intracolor fixed pattern noise, since the RED samples are processed in one path and the GREEN samples are processed in another path. Similarly, processing of a Bayer pattern input signal GBGBGBGBGB from a CCD or other photo detector sensor array is also insensitive to mismatches between parallel processing paths because the successive samples are from different color sensors. Moreover, the sensitivity of photo detectors in the sensor array is color dependent, so different gains are needed in the PGA 140 (FIG. 3) to produce optimum signal amplitude input at the input to the ADC 160. Gain compensation is applied via the ratio of capacitors (FIG. 2).

In a Bayer pattern devices, when the R/G line is switched out and the G/B line is switched in, it is necessary for the GREEN signal from the R/G line to be switched into the same path as the GREEN signal from the G/B line. To this end, an appropriate timing function of the controller 109 is used to route the signals in accordance with the phase clocks and pixel clock described in connection with FIG. 2. Thus, pattern noise on the GREEN color is avoided between the odd and the even lines or signal samples.

Figure 4:
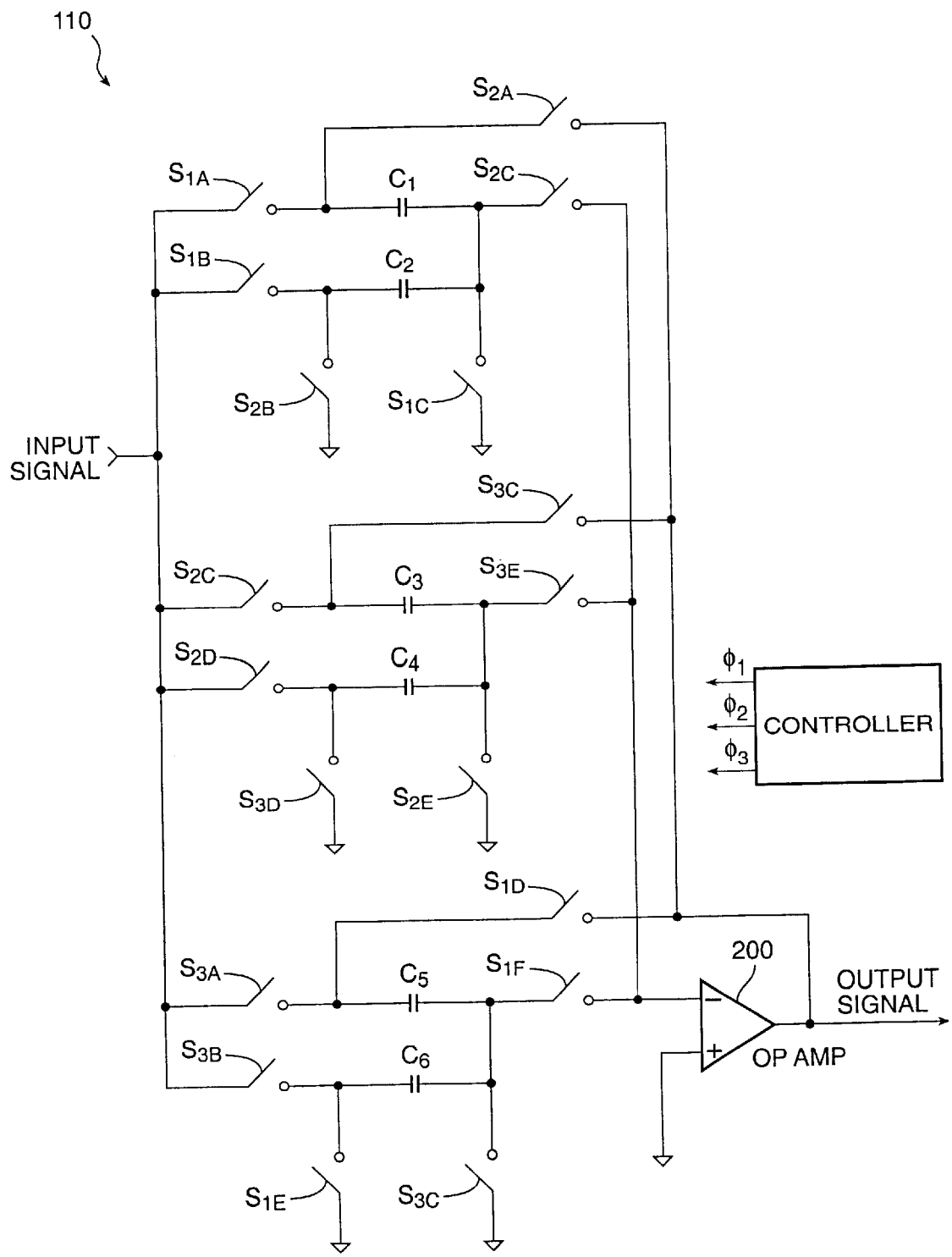
FIG. 4 is a circuit diagram of a three phase circuit according to the invention responsive to a three phase clock controller according to the invention.

FIG. 4 illustrates a second embodiment 110 of the invention suited to other types of RGB patterns, such as found in scanners. By way of contrast, a prior approach would be an adaptation of the configuration of FIG. 3 wherein one multiplexer (not shown) would combine the outputs of three CDSs 120 to feed into a single PGA 140 or another multiplexer (not shown) would combine the outputs of three PGA 140 to feed into a single ADC 160.

In the present invention, three serially connected circuits such as shown in FIG. 3 serve as the CDS 120, the PGA 140 and the ADC 160, each such circuit employing one operational amplifier 200 having their input switched among three signal paths to carry a three different time multiplexed input signals for R, G and B.

Figure 5:
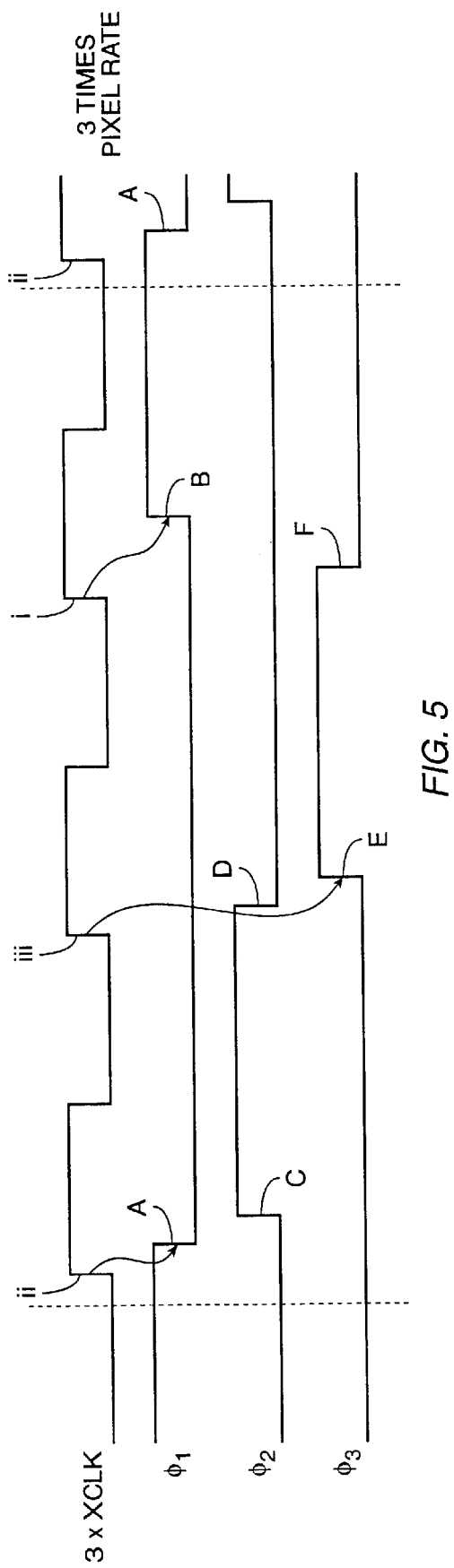
FIG. 5 is a timing diagram of a three phase circuit according to the invention used for three color components.

FIG. 5 illustrates one full cycle of the three phase sample clock according to this embodiment of the invention. The sample clock XCLK operates at three times the pixel rate (trace X) triggered on leading edges corresponding to phases ii, iii, i, ii, etc. Phase 1 terminates at A after the leading edge trigger of clock ii and stays inactive until B, which occurs after a delay following the next Phase 1 trigger i and the phase 3 sample window at F, which also follows i. Phase 2 similarly samples during a non-overlapping window between C and D, while Phase 3 samples during the non-overlapping window bounded by E and F.

Each of the three input paths shown in FIG. 4 are controlled by three phases, Ø1, Ø2, Ø3, which control switching in the same way as the rules governing the two input paths of FIG. 2. The circuit of FIG. 4 is modified to accommodate an additional phase, thus being able to share the operational amplifier stage 200 among three signal paths.

Figure 6:
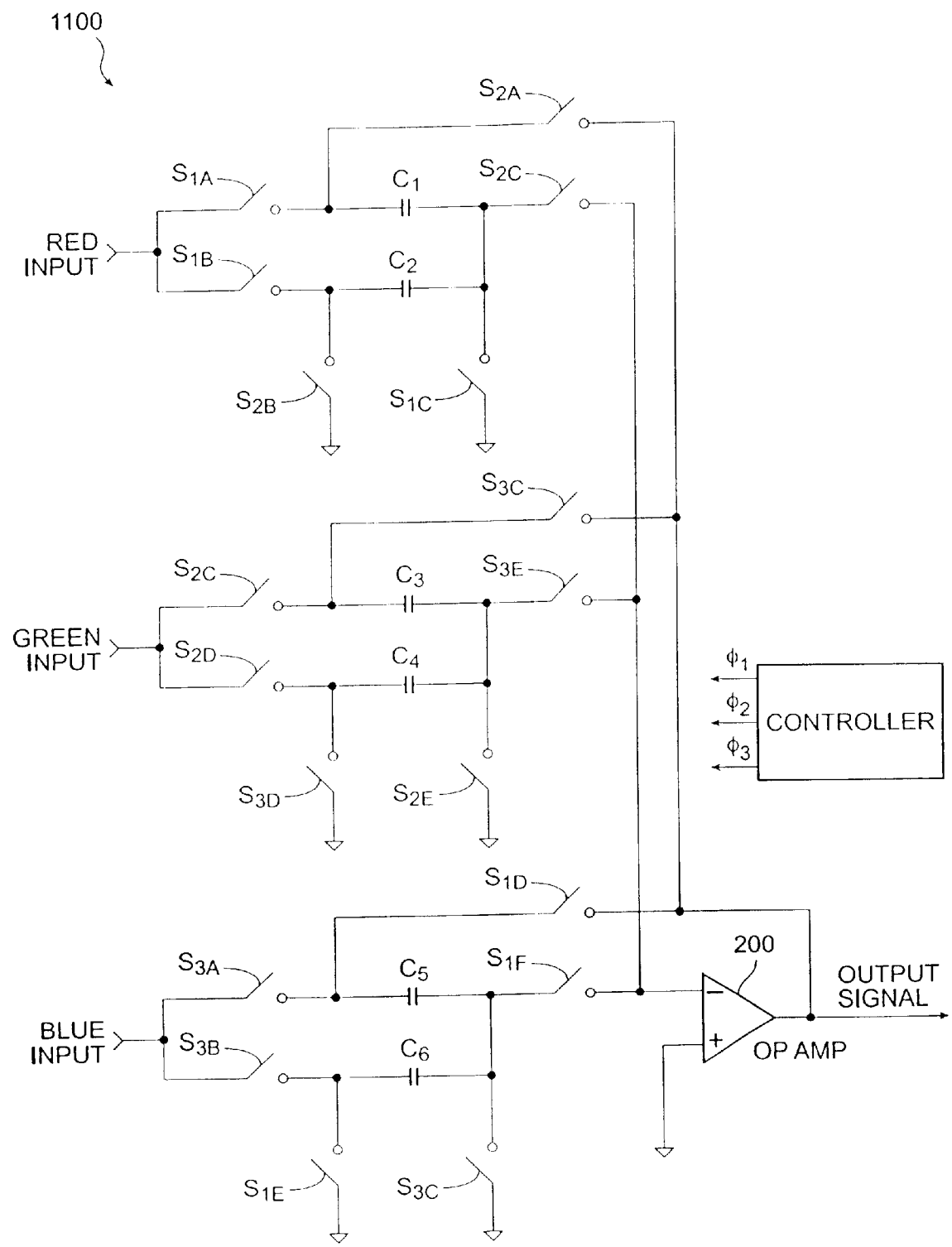
FIG. 6 is a circuit diagram of a further three phase circuit according to the invention.
Figure 7:
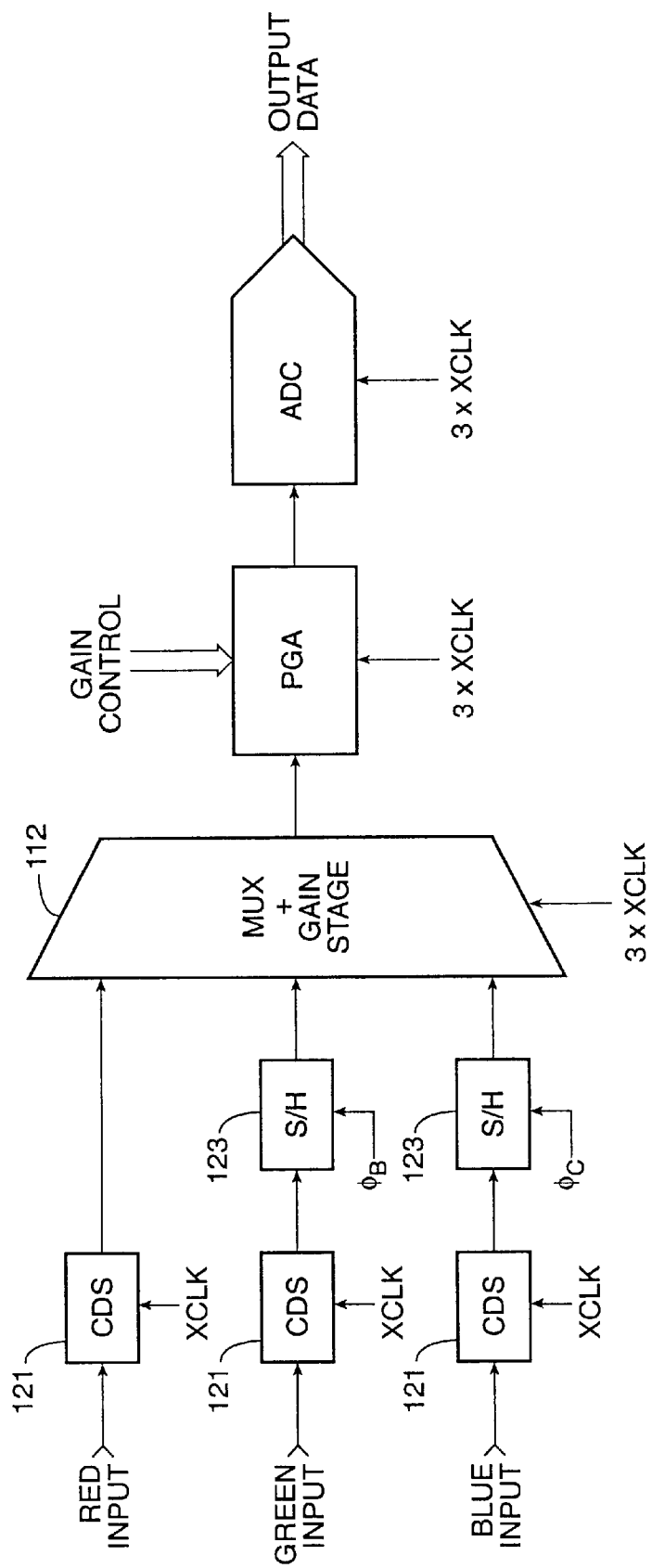
FIG. 7 is a block diagram illustrating a system incorporating circuits such as the embodiments of FIG. 4 and FIG. 7.

FIG. 6 illustrates a further embodiment 1100 wherein the RED, GREEN and BLUE inputs are not time multiplexed on a single line but which are provided from three separate sources. This embodiment 1100 is suitable for implementation of a multiplexing/gain stage in a system illustrated in FIG. 7. Therein three CDS devices 121 carry respective R, G and B signals; one path is fed straight through to the element 1100. The other two devices 121 feed respective sample and hold circuits 123 which introduce phase delay to allow the element 1100 to respond to each of the signals serially. The output is fed to a PGA 140 according to the embodiment of FIG. 2, and to an ADC of the embodiment of FIG. 2.

Circuitry according to the invention can reduce power by a factor of two compared to conventional technology, which is a particularly valuable advance for battery-powered portable devices.

The invention has been explained with reference to specific embodiments. Other embodiments will be apparent to those of ordinary skill in the art. For example, while all illustrations used herein are of single-ended circuitry, most implementations would employ fully differential circuitry. Furthermore, while it is conventional to employ three primary colors, it is contemplated that greater numbers of primary colors could be used to effect a desired color image. It is therefore not intended that the invention be limited, except as indicated by the appended claims.

What is claimed is:

1. A method for processing color component signals comprising the steps of:
   providing first and second successive component samples alternately to a first sampled signal path and a second sampled signal path in a first arbitrary phase and in a second arbitrary phase respectively, said first arbitrary phase and said second arbitrary phase being arbitrary nonoverlapping phases, each sampled signal path comprising a set of capacitors, the ratio of preselected values of which establish a preselected gain for said each signal path; and
   outputting signals from said first sampled signal path and said second sampled signal path alternately in said second arbitrary phase and in said first arbitrary phase respectively, through a single channel amplifier of a pipelined processing path.

2. The method according to claim 1 wherein said component samples are interleaving Red component/Green component and Green component/Blue component.

3. The method according to claim 2 wherein each preselected gain is implemented by at least one additional optional capacitance element for programming said each preselected gain.

4. The method according to claim 1 wherein each preselected gain is implemented by at least one additional optional capacitance element for programming said each preselected gain.

5. A method for processing color component signals comprising the steps of:
   providing a first component sample to a first sampled signal path at a first arbitrary phase;
   providing a second component sample to a second sampled signal path at a second arbitrary phase nonoverlapping with said first arbitrary phase and a third arbitrary phase;
   providing a third component sample to a third sampled signal path at said third arbitrary phase nonoverlapping with said first arbitrary phase and said second arbitrary phase;
   each sampled signal path comprising an array of capacitors, the ratio of preselected values of which establish a preselected gain for said each signal path; and
   outputting signals from said first sampled signal path at said second arbitrary phase or said third arbitrary phase, from said second sampled signal path at said first arbitrary phase or said third arbitrary phase, and from said third sampled signal path at said first arbitrary phase or said second arbitrary phase through a single channel amplifier of a pipelined processing path.

6. The method according to claim 5 wherein said component samples are interleaving Red component, Green component and Blue component.

7. The method according to claim 6 wherein each preselected gain is implemented by at least one additional optional capacitance element for programming said each preselected gain.

8. The method according to claim 5 wherein each preselected gain is implemented by at least one additional optional capacitance element for programming said each preselected gain.

9. The method according to claim 5 wherein said first sampled signal path, said second sampled signal path and said third sampled signal path are coupled to a common signal source.

10. The method according to claim 5 wherein said first sampled signal path, said second sampled signal path and said third sampled signal path are each coupled to separate signal sources.

11. An apparatus for processing color component signals comprising:
    a first sampled signal path and a second sampled signal path, the first sampled signal path comprises a first set of capacitors for receiving first component samples in a first arbitrary phase, the second sampled signal path comprises a second set of capacitors for receiving second component samples in a second arbitrary phase, said first arbitrary phase and said second arbitrary phase being arbitrary nonoverlapping phases, the ratio of preselected values of said capacitors establish a preselected gain for said each signal path;
    a single channel amplifier coupled to receive output signals from said first sampled signal path in said second arbitrary phase and said second sampled signal path in said first arbitrary phase; and
    means for clocking inputs and outputs of each of said sampled signal paths alternately in said phases through said single channel amplifier at each stage of a pipelined processing path.

12. The apparatus according to claim 11 further comprising means for programming capacitance value of said capacitors.

13. An apparatus for processing color component signals comprising:
    a first sampled signal path;
    a second sampled signal path; and
    a third sampled signal path,
    each said first, second and third sampled signal path comprising a set of capacitors for receiving first, second and third successive component samples in a first phase, in a second phase, and in a third phase respectively, said first phase, said second phase and said third phase being arbitrary nonoverlapping phases, the ratio of preselected values of said capacitors establish a preselected gain for said each signal path;
    a single channel amplifier coupled to receive output signals from said first sampled signal path in said second phase or said third phase, from said second sampled signal path in said first phase or said third phase, and from said third sampled signal path in said first phase or said second phase; and
    means for clocking inputs and outputs of each of said sampled signal paths alternately and respectively in said arbitrary nonoverlapping phases through said single amplifier at each stage of a pipelined processing path.

14. The apparatus according to claim 13 further comprising means for programming capacitance value of said capacitors.

* * * * *